United States Patent [19]

Kato

[11] Patent Number: 4,964,686
[45] Date of Patent: Oct. 23, 1990

[54] FINDER OPTICAL DEVICE

[75] Inventor: Masatake Kato, Tokyo, Japan

[73] Assignee: Canon Kabushiki Kaishi, Tokyo, Japan

[21] Appl. No.: 280,584

[22] Filed: Dec. 6, 1988

[30] Foreign Application Priority Data

Dec. 14, 1987 [JP] Japan .................................. 62-315549
Sep. 19, 1988 [JP] Japan .................................. 63-234159

[51] Int. Cl.$^5$ ........................ G02B 23/14; G02B 9/06; G02B 25/00; G03B 13/06
[52] U.S. Cl. .................................. 350/561; 350/572; 350/410; 350/480
[58] Field of Search ........................ 350/561, 572, 481; 354/222-225, 219, 199-201, 155, 166; 358/224

[56] References Cited

U.S. PATENT DOCUMENTS

| | | | |
|---|---|---|---|
| 2,541,014 | 2/1951 | Orser | 350/561 |
| 3,045,545 | 7/1962 | Korones et al. | 350/561 |
| 3,127,809 | 4/1964 | Denk | 350/561 |
| 3,989,349 | 11/1976 | Besenmatter et al. | 350/561 |
| 4,270,837 | 6/1981 | Baker | 350/572 |
| 4,387,967 | 6/1983 | Yamazaki et al. | 354/224 |

*Primary Examiner*—Jon W. Henry
*Attorney, Agent, or Firm*—Fitzpatrick, Cella, Harper & Scinto

[57] ABSTRACT

A secondary image forming type finder opitcal device having an objective lens solely used therefor, comprising, from front to rear, an objective lens unit including at least one positive lens, a relay lens unit formed by arranging a lens of positive refractive power and a lens of negative refractive power in spaced relation, a field lens unit consisting of a positive lens whose front surface is of strong curvature, and an eyepiece lens unit consisting of two positive lenses whose confronting surfaces are of strong curvature, satisfying the following conditions:

$$0.3 < |f_P/f_N| < 0.7, f_N < 0$$
$$20 < \nu_P - \nu_N$$
$$0 \leq (R_P - R_N)/(R_P + R_N) < 0.1$$

where $f_P$ is the focal length of the lens of positive refractive power of the relay lens unit, $\nu_P$ is the Abbe number of its material, $R_P$ is the radius of curvature of a lens surface of the lens of positive refractive power of the relay lens unit which is of strong curvature and faces the lens of negative refractive power of the relays lens unit, $f_N$ is the focal length of the lens of negative refractive power of the relay lens unit, $\nu_N$ is the Abbe number of its material, and $R_N$ is the radius of curvature of a lens surfaces of the lens of negative refractive power of the relay lens unit which is of strong curvature and faces the lens of positive refractive power of the relay lens unit.

9 Claims, 8 Drawing Sheets

FINDER OPTICAL DEVICE

BACKGROUND OF THE INVENTION

1. Field of the Invention

This invention relates to secondary image forming type finder optical devices and, more particularly, to secondary image forming type finder optical devices provided with an objective lens solely used therefor separately from the photographic lens and having a predetermined optical total length, which devices are suited to, for example, electronic still cameras or video cameras.

2. Description of the Related Art

Recently, a variety of kinds of photographic systems on the electronic still camera which magnetically records video information in the small-sized floppy disc have been proposed. Of these proposals, particularly for the finder optical device, various types are adopted.

The electronic still camera differs largely from the conventional camera for silver halide photosensitive material in the shape of the entirety of the camera depending on how to arrange the floppy disc in the camera body.

For example, in the case of containing the floppy disc in a chamber whose plane is parallel to the optical axis of the photographic lens, the shape becomes an axially elongated one as in the motion video camera of the unified type of recorder and reproducer, or the like.

The so-called reverse Galilean finder optical device which has so far been suited well to the external finder optical device for the silver halide camera, and the real image finder optical device of the primary image forming type using the prism for non-reverse erecting image, when applied to the electronic still camera, etc., because of their optical total length being too short, have given rise to, for example, the following problems.

That is, to secure a sufficiently long eye point by arranging the eyepiece lens of the finder optical device at or near the rear plane of the camera, the shortage of the optical total length of the finder optical device causes the front vertex of the objective lens to be arranged in a considerably secluded position from the front plane of the camera. For this reason, to secure the finder light beam without eclipse, the size of the opening portion for the finder optical device in the front panel of the camera housing must be increased, which calls for an increase of the distance from the optical axis of the photographic lens to that of the finder optical device. Thus, a problem of intensifying the finder parallax and others arose.

The conventional secondary image forming type finder optical devices for use in the video cameras or the like, on the other hand, generally become too long in the axial direction. Hence, they are not very suited to be used in, for example, electronic still cameras.

SUMMARY OF THE INVENTION

An object of the present invention is to provide a secondary image forming type finder optical device wherein light from a finder image formed by an objective lens unit is further focused by a relay lens unit or the like to form a non-reverse erecting finder image to be observed through an eyepiece lens unit, and wherein the construction and arrangement and the refractive powers of the constituent lenses of each lens unit are so properly designed that the optical total length takes a desired value, while still permitting the possibility of observing a finder image of high quality.

Another object is to provide a secondary image forming type finder optical device suited to the electronic still camera or video camera.

DETAILED DESCRIPTION OF THE PREFERRED EMBODIMENTS

Figure 1:
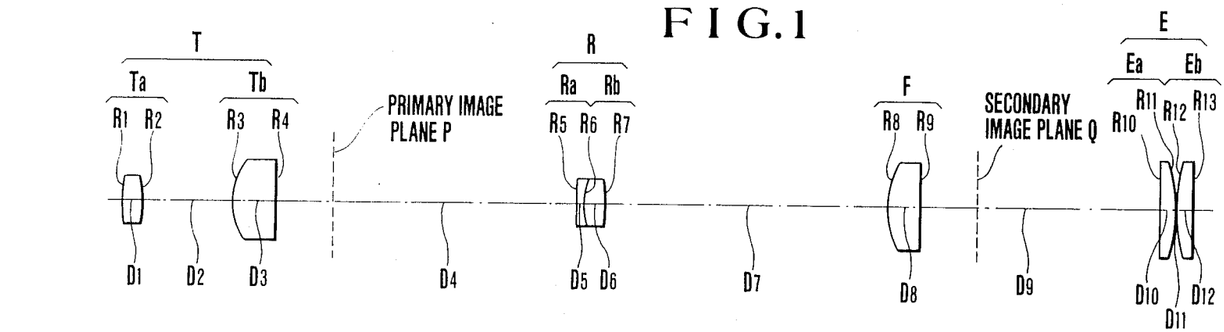
FIG. 1 to FIG. 3 are lens block diagrams illustrating numerical examples 1-3 of the invention.
Figure 2:
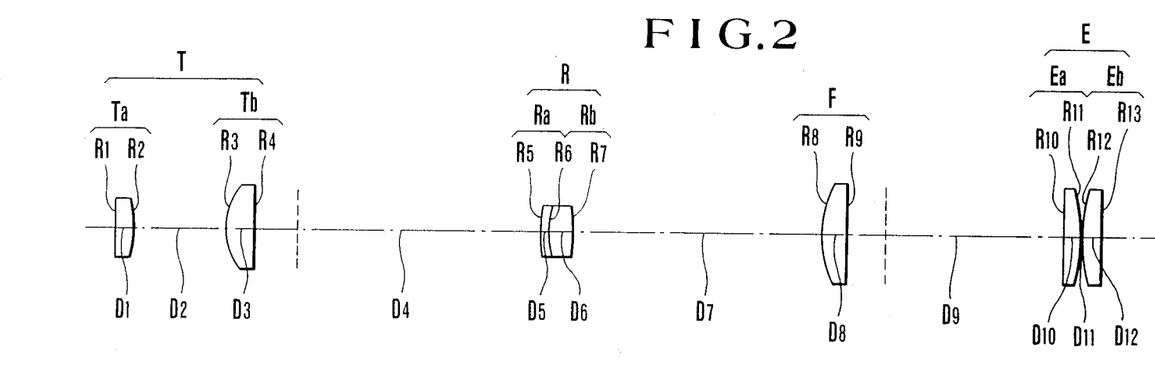
Figure 3:
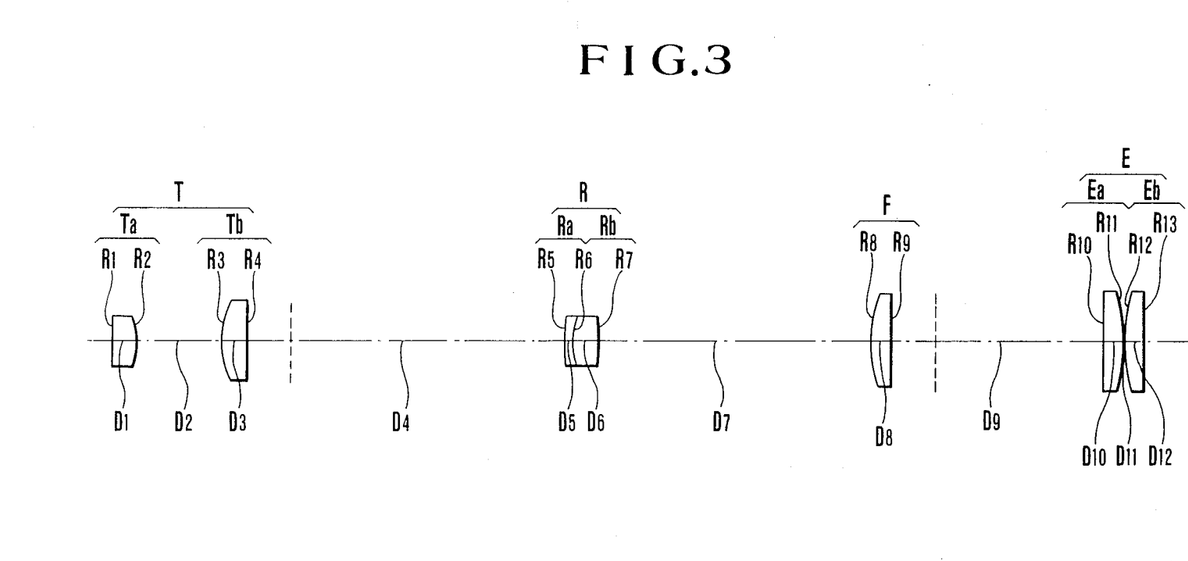

FIG. 1 to FIG. 3 and FIG. 7 to FIG. 9 schematically show numerical examples 1 to 6 of embodiments of finder optical devices according to the invention, respectively. It should be noted that the finder optical device of the invention is arranged separately from the photographic lens (not shown). In FIG. 1 to FIG. 3, T is an objective lens unit comprising two positive lenses Ta and Tb arranged so that their lens surfaces of strong curvature face each other. Incidentally, the lens Tb plays chiefly the role of a field lens. A relay lens unit R comprises a negative lens Ra and a positive lens Rb. A field lens unit F is arranged in the neighborhood of a secondary image plane Q, and comprises a positive lens convex toward the front. An eyepiece lens unit E comprises two positive lenses Ea and Eb arranged so that their lens surfaces of strong curvature face each other.

In the secondary image forming type finder optical device in this embodiment, at first, the objective lens unit T forms a first finder image on a primary image plane P, and the relay lens unit R and the field lens unit F then focus the light from the first finder image to form a non-reverse erecting second finder image on a secondary image plane Q. And, the non-reverse erecting second finder image formed on the secondary image plane Q is made to be observed by the eyepiece lens unit E.

The finder optical device of the invention satisfies the following conditions:

$$1.0 < f_R/f_T < 1.8 \ldots \quad (1)$$

$$1.0 < f_F/f_E < 1.7 \ldots \quad (2)$$

where $f_T$, $f_R$, $f_F$ and $f_E$ are respectively the focal lengths of the objective lens unit T, the relay lens unit R, the field lens unit F and the eyepiece lens unit E.

The inequalities of condition (1) concern with the refractive power arrangement of the relay lens unit R and the objective lens unit T, which is most important in the present embodiment. Now, on the assumption that the focal length of the photographic lens and the finder field rate are constant, it is possible that, as the composite focal length $f_T$ of the objective lens unit T increases, the finder magnification increases. But, because the magnification at the primary image plane P becomes large, the secondary image forming system comprised of the relay lens unit R and the field lens unit F gets harder to correct for aberrations. Meanwhile, the secondary image forming system, when the image magnification is unity, has a shortest optical total length, taking a value of about $4f_R$. Thus, the shorter the focal length of the relay lens unit R, the more advantageously the optical total length is shortened, but the more difficult the aberration correction becomes.

On account of such a reason as described above, in the present embodiment, the focal lengths of the objective lens unit T and the relay lens unit R are made so determined that their ratio or $f_R/f_T$ satisfies the condition (1).

When the lower limit of the inequalities of condition (1) is exceeded, it is advantageous for the finder magnification and the shortening of the optical total length, but the Petzval image surface gets harder to correct well. When the upper limit is exceeded, on the other hand, the optical total length is increased objectionably, although the aberrations can advantageously be corrected.

The inequalities of condition (2) have a main aim to minimize the diameter of the relay lens unit R. In this embodiment, the focal lengths of the field lens unit F and the eyepiece lens unit E are made so determined that the principal ray of the off-axis pupil which is to pass through the center of the observation pupil passes through almost the center of the relay lens unit R. Therefore, despite the strengthening of the refractive power of the relay lens unit R, the light beam which would otherwise be refracted from the marginal zone of the lens can be avoided. Hence, the good quality can be secured over the entire area of the observation pupil.

When the upper limit of the inequalities of condition (2) is exceeded, the diameter of the relay lens unit R increases largely, and the diameter of the eyepiece lens unit E also becomes larger. Conversely when the lower limit of the inequalities of condition (2) is exceeded, the diameter of the relay lens unit R becomes larger, the curvature of field produced in the field lens unit F becomes impossible to correct.

Next, when the relay lens unit R is constructed in the cemented form as shown in FIGS. 1 to 3, conditions for preserving good optical performance are given below.

They are for the refractive indices $N_N$ and $N_P$ of the materials of the negative lens Ra and the positive lens Rb of the relay lens unit R respectively, the Abbe numbers $\nu_N$ and $\nu_P$ of the materials of the negative lens Ra and the positive lens Rb of the relay lens unit R respectively and the radius of curvature RA of the cemented lens surface of the relay lens unit R to satisfy the following conditions:

$$0.3 < |RA|/f_R < 0.6 \quad (3)$$

$$0.07 < N_N - N_P \quad (4)$$

$$25 < \nu_P - \nu_N \quad (5)$$

Particularly, the relay lens unit R is constructed so as to satisfy the conditions (3) to (5), and the objective lens unit T and the eyepiece lens unit E each are constructed with the two lenses whose confronting surfaces are of strong curvature, so that the various aberrations are well canceled in each lens unit itself, thus achieving good balance of aberration correction.

The inequalities of condition (3) concern with the radius of curvature of the cemented lens surface of the relay lens unit R. When the upper limit is exceeded, the curvature of field becomes difficult to correct. Conversely when the lower limit is exceeded, the spherical aberration on the secondary image plane Q becomes over-corrected.

The inequalities of conditions (4) and (5) concern with the refractive indices and Abbe numbers of the materials of the negative lens Ra and the positive lens Rb constituting the relay lens unit R. Mainly the condition (4) concerns with the refractive index difference for enabling the curvature of field to be corrected well, and the condition (5) concerns with the Abbe number difference for enabling, among others, the longitudinal chromatic aberration to be corrected.

When the condition (4) is violated, the curvature of field toward the marginal zone of the image frame becomes larger. Also, when the condition (5) is violated, the chromatic aberration increases. In any case, it becomes difficult to obtain the good finder image.

It should be noted that of the singlet lenses constituting the objective lens unit, the field lens unit and eyepiece lens unit, arbitrary one or ones may otherwise be constructed in cemented form, comprising a positive lens and a negative lens cemented together. According to this, a finder optical device better corrected for chromatic aberrations and other aberration and having a higher grade of optical performance can be achieved.

Figure 7:
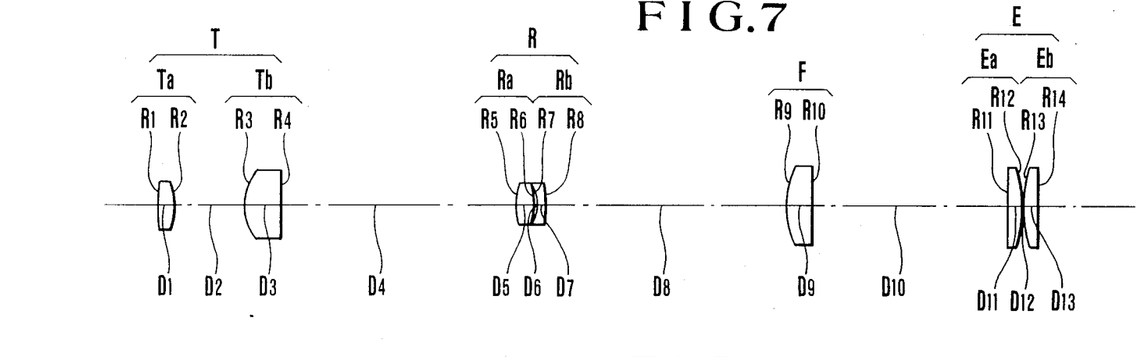
FIG. 7 to FIG. 9 are lens block diagrams illustrating numerical examples 4-6 of the invention.
Figure 8:
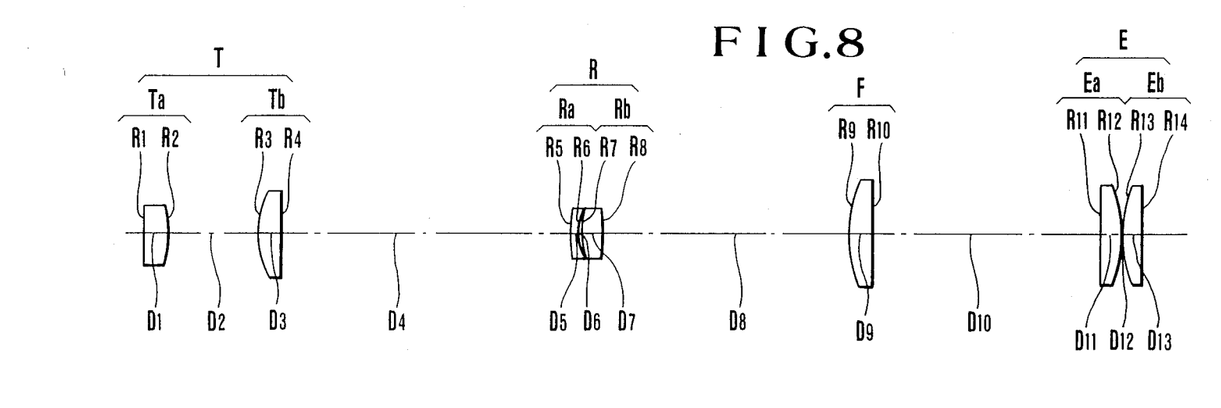
Figure 9:
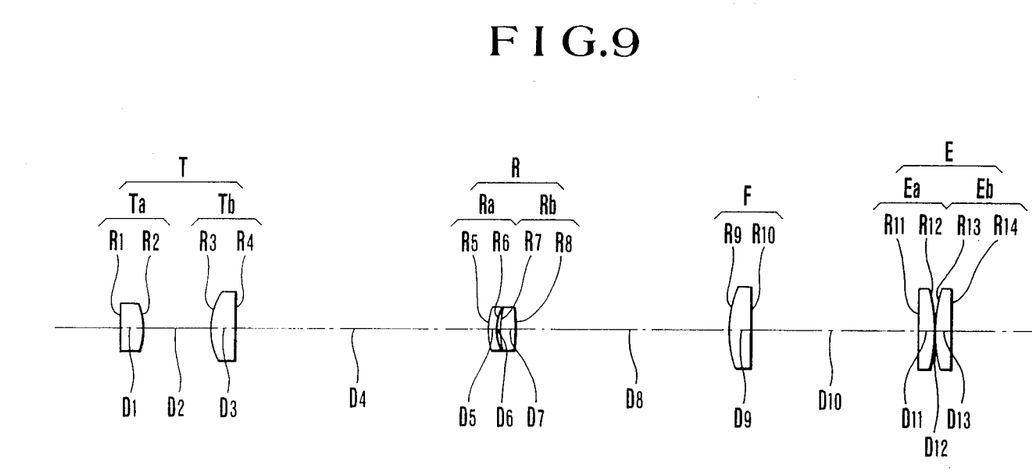

Next, desirable conditions in another embodiment which is different from the embodiment of FIGS. 1 to 3 in that the relay lens unit of the finder optical device is divided as shown in FIGS. 7 to 9 are shown.

It should be noted that this embodiment, too, satisfies the above-described conditions (1) and (2).

The objective lens unit T comprises two positive lenses Ta and Tb arranged so that their lens surfaces of strong curvature face each other. Incidentally, the lens Ta may be made up by a plurality of lenses for the purpose of improving aberration correction. Also, the lens Tb plays the role of a field lens. Hence the primary image is formed in the neighborhood of the lens Tb.

The relay lens unit R comprises a lens Ra of positive refractive power and a lens Rb of negative refractive power. An air lens is formed between the lenses Ra and Rb. The curvature of one of lens surfaces of the lens Ra of positive refractive power which faces the lens Rb of negative refractive power is stronger than that of the other surface. The field lens unit F comprises one positive lens turning its strong convexity to the object side. A secondary image is formed in the neighborhood of the field lens unit F. The eyepiece lens unit E comprises two positive lenses Ea and Eb, the surfaces of strong curvature of the lenses Ea and Eb facing each other.

What is important in this embodiment is the refractive power arrangement of the relay lens unit R. In a case where the focal length of the photographic lens and the finder field rate are constant, a longer composite focal length of the objective lens unit T enables the finder magnification to be greater, but causes the size at the primary image plane to get larger. Thus, the difficult point is in the aberration correction of the secondary image forming system. Meanwhile, the secondary image forming system, when the image magnification is unity, becomes shortest in the total length. The shorter the focal length of the relay lens unit R, the more advantageously the total length can be shortened, but the more difficult the aberrations become to correct.

Next, conditions for maintaining the desired optical performance are set forth as follows:

$$0.3 < |f_P/f_N| < 0.7, f_N < 0 \quad (6)$$

-continued $$20 < \nu_P - \nu_N \quad (7)$$

$$0 \leq (R_P - R_N)/(R_P + R_N) < 0.1 \quad (8)$$

where $f_P$ is the focal length of the lens Ra of positive refractive power of the relay lens unit R, $\nu_P$ is the Abbe number of its material, $R_P$ is the radius of curvature of its lens surface of strong curvature, $f_N$ is the focal length of the lens Rb of negative refractive power of the relay lens unit R, $\nu_N$ is the Abbe number of its material, and $R_N$ is the radius of curvature of its lens surface of strong curvature.

The inequalities of condition (6) represent a preferable range on aberration correction for the focal lengths of the positive lens Ra and the negative lens Rb constituting the relay lens unit R when a shortening of the total length by strengthening the refractive power of the relay lens unit R is achieved.

Since the composite focal length of the relay lens unit R has a positive refractive power, when the refractive power of the positive lens Ra becomes strong as exceeding the lower limit, although it is advantageous to shortening the total length, because the diverging action in the relay lens unit R weakens, under-corrected spherical aberration is produced. Meanwhile, when the refractive power of the negative lens Rb strengthens as exceeding the upper limit, it gets harder to achieve a shortening of the total length while well correcting the spherical aberration.

The inequality of condition (7) concerns with the difference between the Abbe numbers of the materials of the positive lens Ra and the negative lens Rb constituting the relay lens unit R. When the difference between the Abbe numbers becomes smaller than the limit, correction of longitudinal chromatic aberration gets harder.

The inequalities of condition (8) are to determine the shape of an air lens between the positive lens Ra and the negative lens Rb constituting the relay lens unit R. Incidentally, this air lens has a negative refractive power. When the upper limit is exceeded, spherical aberration and curvature of field both get under-corrected. Conversely when the lower limit is exceeded, both of the spherical aberration and the curvature of field get over-corrected objectionably.

Figure 10:
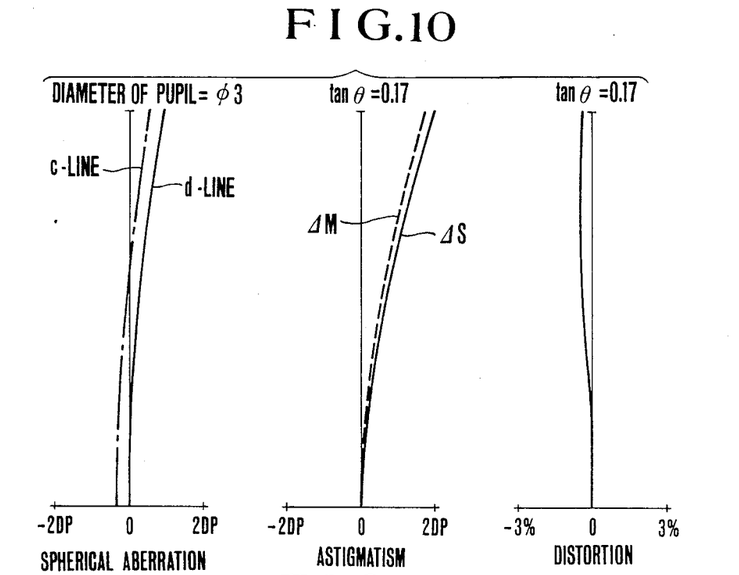
FIG. 10 to FIG. 12 are aberration curves corresponding to the numerical examples 4-6, respectively, with an object distance of 3 m.
Figure 11:
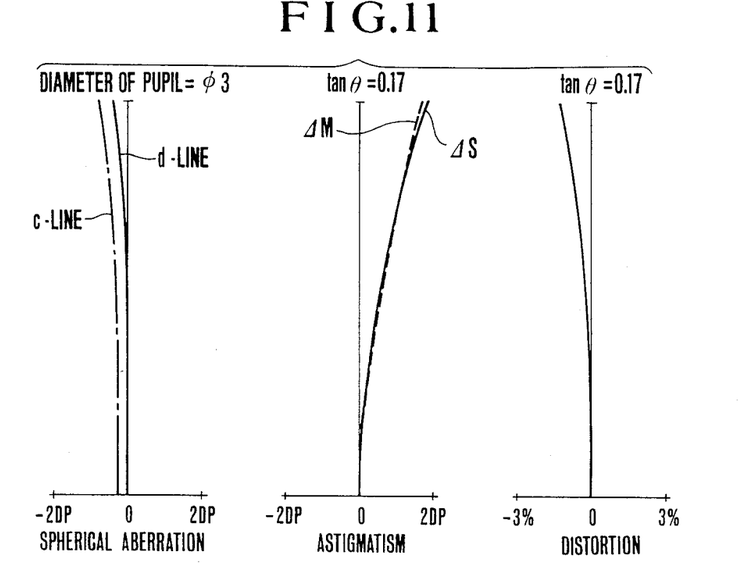
Figure 12:
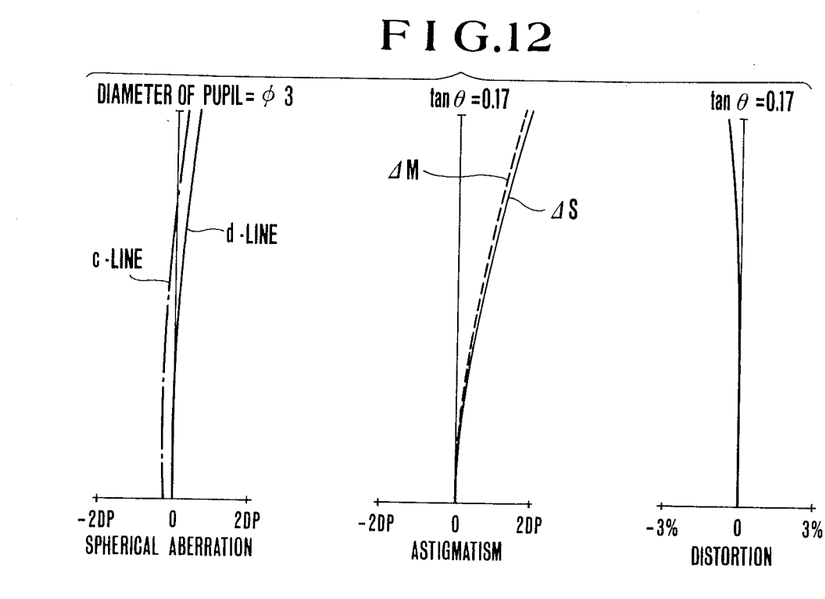

It will be appreciated from the foregoing discussion and is even apparent from the aberration curves of FIG. 10 to FIG. 12 that according to this embodiment, the relay lens unit R of the secondary image forming system is divided into the positive lens Ra and the negative lens Rb, and their refractive powers are properly arranged, whereby an increase of the degree of freedom on aberration correction and a shortening of the optical total length can be achieved.

Another advantage arising from the use of the divided form of the relay lens R into the positive lens Ra and the negative lens Rb is that it becomes even possible to choose synthetic resin or the like as the optical material.

Next, numerical examples 1 to 6 of the invention are shown. In the numerical examples 1 to 6, Ri is the radius of curvature of the i-th lens surface counting from front, Di is the i-th lens thickness or air separation counting from front, and Ni and $\nu i$ are respectively the refractive index and Abbe number of the glass of the i-th lens element counting from front.

Also, the relations of each of the before-described conditions (1) to (5) with the various numerical values in the numerical examples 1 to 3 are shown in Table-1.

Numerical Example 1 (FIGS. 1 and 4):
Exit Pupil Diameter $\phi 3$; Max. Emergence Angle $\tan \Theta = 0.17$

Figure 4:
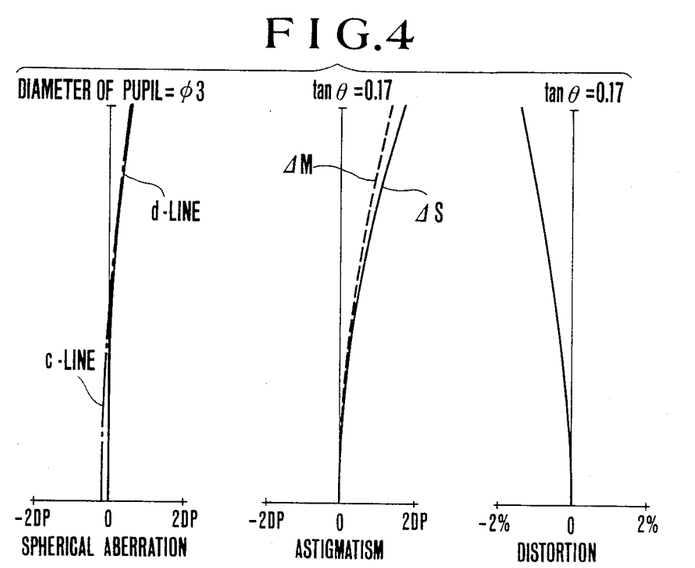
FIG. 4 to FIG. 6 are aberration curves corresponding to the numerical examples 1-3, respectively, with an object distance of 3 m.

| R1 = | 33.14 | D1 = | 2.00 | N1 = 1.49171 | $\nu 1$ = 57.4 |
|---|---|---|---|---|---|
| R2 = | −9.63 | D2 = | 9.43 | | |
| R3 = | 7.79 | D3 = | 4.28 | N2 = 1.49171 | $\nu 2$ = 57.4 |
| R4 = | ∞ | D4 = | 31.40 | | |
| R5 = | 25.85 | D5 = | 0.72 | N3 = 1.84666 | $\nu 3$ = 23.9 |
| R6 = | 7.24 | D6 = | 2.43 | N4 = 1.77250 | $\nu 4$ = 49.6 |
| R7 = | −22.44 | D7 = | 29.00 | | |
| R8 = | 10.62 | D8 = | 3.20 | N5 = 1.49171 | $\nu 5$ = 57.4 |
| R9 = | ∞ | D9 = | 24.86 | | |
| R10 = | ∞ | D10 = | 1.50 | N6 = 1.49171 | $\nu 6$ = 57.4 |
| R11 = | −20.00 | D11 = | 0.15 | | |
| R12 = | 20.00 | D12 = | 1.50 | N7 = 1.49171 | $\nu 7$ = 57.4 |
| R13 = | ∞ | | | | |

Note:
The eye point lies 16 mm behind the vertex of the lens surface R13.
$f_T = 11.35, f_R = 18.0, f_F = 21.61, f_E = 20.37$ Numerical Example 2 (FIGS. 2 and 5):
Exit Pupil Diameter $\phi 3$; Max. Emergence Angle $\tan \Theta = 0.17$

Figure 5:
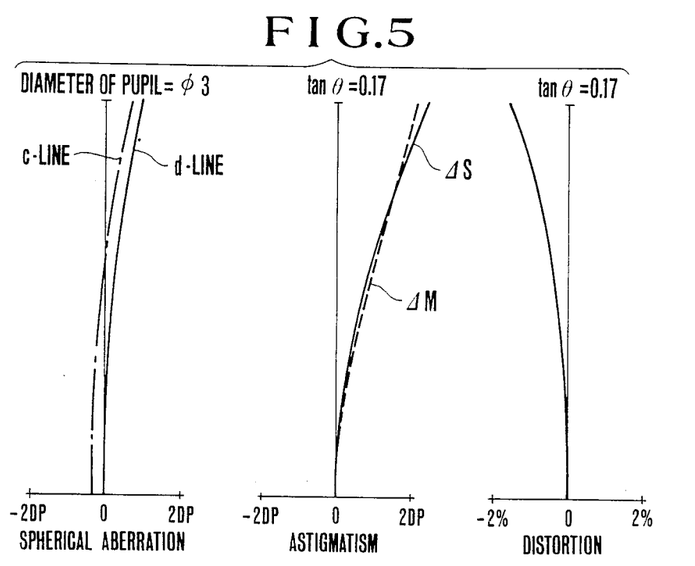

| R1 = | ∞ | D1 = | 1.80 | N1 = 1.77250 | $\nu 1$ = 49.6 |
|---|---|---|---|---|---|
| R2 = | −12.44 | D2 = | 9.60 | | |
| R3 = | 7.85 | D3 = | 2.80 | N2 = 1.49171 | $\nu 2$ = 57.4 |
| R4 = | −148.41 | D4 = | 28.89 | | |
| R5 = | 17.85 | D5 = | 0.80 | N3 = 1.84666 | $\nu 3$ = 23.9 |
| R6 = | 7.27 | D6 = | 2.60 | N4 = 1.71300 | $\nu 4$ = 53.8 |
| R7 = | −18.74 | D7 = | 25.07 | | |
| R8 = | 11.09 | D8 = | 2.40 | N5 = 1.49171 | $\nu 5$ = 57.4 |
| R9 = | ∞ | D9 = | 22.01 | | |
| R10 = | 144.93 | D10 = | 1.80 | N6 = 1.49171 | $\nu 6$ = 57.4 |
| R11 = | −20.70 | D11 = | 0.15 | | |
| R12 = | 20.70 | D12 = | 1.80 | N7 = 1.49171 | $\nu 7$ = 57.4 |
| R13 = | −144.93 | | | | |

$f_T = 11.34, f_R = 15.39, f_F = 22.56, f_E = 18.61$

Numerical Example 3 (FIGS. 3 and 6):
Exit Pupil Diameter $\phi 3$; Max. Emergence Angle $\tan \Theta = 0.17$

Figure 6:
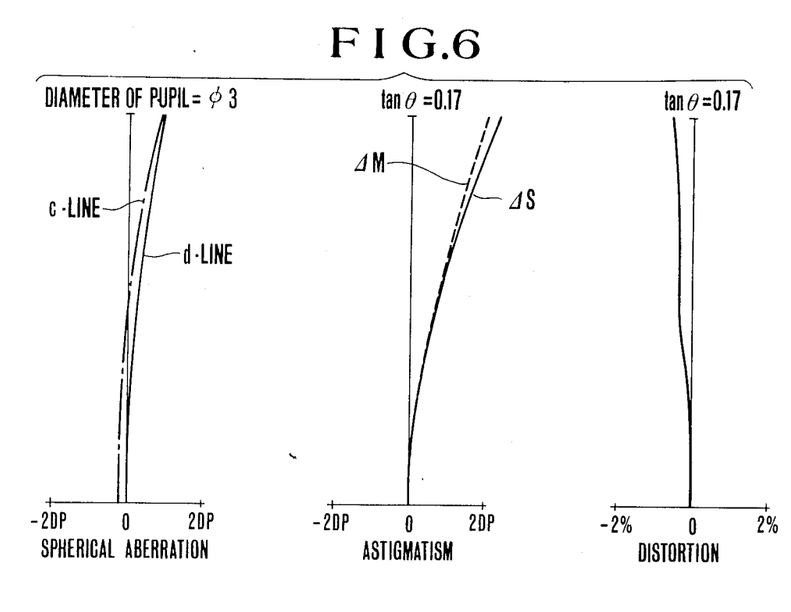

| R1 = | 5458.52 | D1 = | 2.60 | N1 = 1.49171 | $\nu 1$ = 57.4 |
|---|---|---|---|---|---|
| R2 = | −8.01 | D2 = | 9.09 | | |
| R3 = | 8.01 | D3 = | 2.60 | N2 = 1.49171 | $\nu 2$ = 57.4 |
| R4 = | −5458.52 | D4 = | 32.92 | | |
| R5 = | 17.72 | D5 = | 0.80 | N3 = 1.84666 | $\nu 3$ = 23.9 |
| R6 = | 7.24 | D6 = | 2.60 | N4 = 1.69680 | $\nu 4$ = 55.5 |
| R7 = | −20.84 | D7 = | 27.93 | | |
| R8 = | 12.13 | D8 = | 2.40 | N5 = 1.49171 | $\nu 5$ = 57.4 |
| R9 = | ∞ | D9 = | 22.07 | | |
| R10 = | 389.49 | D10 = | 1.80 | N6 = 1.49171 | $\nu 6$ = 57.4 |
| R11 = | −19.15 | D11 = | 0.15 | | |
| R12 = | 19.15 | D12 = | 1.80 | N7 = 1.49171 | $\nu 7$ = 57.4 |
| R13 = | −389.49 | | | | |

$f_T = 11.30, f_R = 17.0, f_F = 24.68, f_E = 18.66$

TABLE 1

| | Numerical Example | | |
|---|---|---|---|
| Condition | 1 | 2 | 3 |
| (1) $f_R/f_T$ | 1.59 | 1.36 | 1.50 |
| (2) $f_F/f_E$ | 1.06 | 1.21 | 1.32 |
| (3) $|RA|/f_R$ | 0.40 | 0.47 | 0.43 |
| (4) $N_N - N_P$ | 0.074 | 0.134 | 0.150 |
| (5) $\nu_P - \nu_N$ | 25.7 | 29.9 | 31.6 |

Numerical Example 4 (FIGS. 7 and 10):
Exit Pupil Diameter φ3; Max. Emergence Angle tan Θ = 0.17

| | | | | | | |
|---|---|---|---|---|---|---|
| R1 = | 33.142 | D1 = | 2.00 | N1 = 1.49171 | ν1 = 57.4 |
| R2 = | −9.632 | D2 = | 9.43 | | |
| R3 = | 7.799 | D3 = | 4.28 | N2 = 1.49171 | ν2 = 57.4 |
| R4 = | 0.000 | D4 = | 30.49 | | |
| R5 = | 20.766 | D5 = | 2.43 | N3 = 1.69680 | ν3 = 55.5 |
| R6 = | −7.369 | D6 = | 0.15 | | |
| R7 = | −6.828 | D7 = | 0.72 | N4 = 1.58347 | ν4 = 30.2 |
| R8 = | −45.349 | D8 = | 31.19 | | |
| R9 = | 10.627 | D9 = | 3.20 | N5 = 1.49171 | ν5 = 57.4 |
| R10 = | 0.000 | D10 = | 24.86 | | |
| R11 = | 0.000 | D11 = | 1.50 | N6 = 1.49171 | ν6 = 57.4 |
| R12 = | −20.000 | D12 = | 0.15 | | |
| R13 = | 20.000 | D13 = | 1.50 | N7 = 1.49171 | ν7 = 57.4 |
| R14 = | 0.000 | | | | |

Note:
The eye point lies 16 mm behind the vertex of the lens surface R14.
$f_P = 8.09$  $f_N = -13.87$ Numerical Example 5 (FIGS. 8 and 11):
Exit Pupil Diameter φ3; Max. Emergence Angle tan Θ = 0.17

| | | | | | | |
|---|---|---|---|---|---|---|
| R1 = | 5032.000 | D1 = | 2.60 | N1 = 1.49171 | ν1 = 57.4 |
| R2 = | −8.086 | D2 = | 9.05 | | |
| R3 = | 8.086 | D3 = | 2.60 | N2 = 1.49171 | ν2 = 57.4 |
| R4 = | −5032.000 | D4 = | 29.78 | | |
| R5 = | 10.078 | D5 = | 0.80 | N3 = 1.84666 | ν3 = 23.9 |
| R6 = | 6.343 | D6 = | 0.15 | | |
| R7 = | 6.986 | D7 = | 2.45 | N4 = 1.49171 | ν4 = 57.4 |
| R8 = | −11.800 | D8 = | 25.07 | | |
| R9 = | 11.091 | D9 = | 2.40 | N5 = 1.49171 | ν5 = 57.4 |
| R10 = | −5032.000 | D10 = | 23.13 | | |
| R11 = | 144.930 | D11 = | 1.80 | N6 = 1.49171 | ν6 = 57.4 |
| R12 = | −20.709 | D12 = | 0.15 | | |
| R13 = | 20.709 | D13 = | 1.80 | N7 = 1.49171 | ν7 = 57.4 |
| R14 = | −144.930 | | | | |

$f_P = 9.33$  $f_N = -22.41$

Numerical Example 6 (FIGS. 9 and 12):
Exit Pupil Diameter φ3; Max. Emergence Angle tan Θ = 0.17

| | | | | | | |
|---|---|---|---|---|---|---|
| R1 = | 5458.520 | D1 = | 2.60 | N1 = 1.49171 | ν1 = 57.4 |
| R2 = | −8.017 | D2 = | 9.09 | | |
| R3 = | 8.017 | D3 = | 2.60 | N2 = 1.49171 | ν2 = 57.4 |
| R4 = | −5458.520 | D4 = | 32.72 | | |
| R5 = | 15.012 | D5 = | 0.72 | N3 = 1.58347 | ν3 = 30.2 |
| R6 = | 4.807 | D6 = | 0.15 | | |
| R7 = | 4.936 | D7 = | 2.50 | N4 = 1.49171 | ν4 = 57.4 |
| R8 = | −11.802 | D8 = | 27.67 | | |
| R9 = | 12.135 | D9 = | 2.40 | N5 = 1.49171 | ν5 = 57.4 |
| R10 = | 0.000 | D10 = | 22.07 | | |
| R11 = | 389.490 | D11 = | 1.80 | N6 = 1.49171 | ν6 = 57.4 |
| R12 = | −19.154 | D12 = | 0.15 | | |
| R13 = | 19.154 | D13 = | 1.80 | N7 = 1.49171 | ν7 = 57.4 |
| R14 = | −389.490 | | | | |

$f_P = 7.44$  $f_N = -12.44$

What is claimed is:

1. A finder optical device comprising:
    an objective lens unit having a positive refractive power and comprising two lenses of positive refractive power;
    a relay lens unit for relaying and re-forming an image formed by said objective lens unit and comprising a cemented lens comprised of a negative lens of negative refractive power and a positive lens of positive refractive power;
    a field lens unit positioned in the neighborhood of an image plane of said relay lens unit; and
    an eyepiece lens unit for observation of an image formed by said relay lens and comprising two positive lenses of positive refractive power,
wherein the following conditions are satisfied:

$$1.0 < f_R/f_T < 1.8$$

$$1.0 < f_F/f_E < 1.7$$

where $f_T$, $f_R$, $f_F$, $f_E$ are respectively focal lengths of said objective lens unit, said relay lens unit, said field lens unit and said eyepiece lens unit.

2. A device according to claim 1, wherein said objective lens unit consists of two lenses of positive refractive power having respective confronting surfaces of strong curvature, wherein said relay lens unit consists of a cemented lens comprised of a negative lens of negative refractive power and a positive lens of positive refractive power, wherein said field lens unit consists of a lens having a lens surface of strong curvature facing the object side, and wherein said eyepiece lens unit consists of two positive lenses having respective confronting surface of strong curvature.

3. A device according to claim 2, satisfying the following conditions:

$$0.3 < |RA|/f_R < 0.6$$

$$0.07 < N_N - N_P$$

$$25 < \nu_P - \nu_N$$

where $N_N$ and $N_P$ are respectively refractive indices of materials of said negative lens and said positive lens of said relay lens unit; $\nu_N$ and $\nu_P$ are respectively Abbe numbers of the materials of said negative lens and said positive lens of said relay lens unit, and RA is a radius of curvature of a cemented lens surface of said relay lens unit.

4. A device according to claim 1, wherein said relay lens unit includes a positive lens of positive refractive power and a negative lens of negative refractive power, said positive lens and said negative lens being arranged in spaced relation by an air space.

5. A device according to claim 4, satisfying the following conditions:

$$0.3 < |f_P/f_N| < 0.7, f_N < 0$$

$$20 < \nu_P - \nu_N$$

$$0 \leq (R_P - R_N)/(R_P + R_N) < 0.1$$

where $f_P$ is a focal length of said positive lens of said relay lens unit, $\nu_P$ is an Abbe number of a material of said positive lens, $R_P$ is a radius of curvature of a lens surface of said positive lens which is of strong curvature and faces said negative lens, $f_N$ is a focal length of said negative lens of said relay lens unit, $\nu_N$ is an Abbe number of a material of said negative lens, and $R_N$ is a radius of curvature of a lens surface of said negative lens which is of strong curvature and faces said positive lens.

6. A finder optical device comprising:
    an objective lens unit having a positive refractive power and comprising two positive lenses;
    a relay lens unit for relaying and re-forming an image formed by said objective lens unit, said relay lens unit including a positive lens having a positive refractive power and a negative lens having a negative refractive power wherein said positive lens and said negative lens of said relay lens unit are arranged with an air space therebetween, and a field lens having a positive refractive power is positioned in the neighborhood of an image formed by said relay lens unit; and an eyepiece lens unit comprising two positive lenses for observing an image formed by said relay lens unit, wherein the following condition is satisfied:

$$0.3 < |f_P/f_N| < 0.7$$

where $f_P$ and $f_N$ are respectively focal lengths of said positive lens and said negative lens.

7. A device according to claim 6, satisfying the following conditions:

$$20 < \nu_P - \nu_N$$

$$0 \leq (R_P - R_N)/(R_P + R_N) < 0.1$$

where $\nu_P$ is an Abbe number of a material of said positive lens of said relay lens unit, $R_P$ is a radius of curvature of a lens surface of said positive lens of said relay lens unit which faces said negative lens of said relay lens unit, $\nu_N$ is an Abbe number of a material of said negative lens of said relay lens unit, and $R_N$ is a radius of curvature of a lens surface of said negative lens of said relay lens unit which faces said positive lens of said relay lens unit.

8. A secondary image forming type finder optical device for use with cameras, comprising:
    an objective lens unit having a positive refractive power;
    a relay lens unit consisting of a negative lens having a negative refractive power and a positive lens having a positive refractive power for relaying and re-forming an image formed by said objective lens unit;
    a field lens unit positioned in the neighborhood of an image plane of said relay lens unit; and
    an eyepiece lens unit for observation of an image formed by said relay lens,
    wherein the following conditions are satisfied:

$$1.0 < f_R/f_T < 1.8$$

$$1.0 < f_F/f_E < 1.7$$

where $f_T$, $f_R$, $f_F$, $f_E$ are respectively focal lengths of said objective lens unit, said relay lens unit said field lens unit and said eyepiece lens unit.

9. A secondary image forming type finder optical device for use with cameras, comprising:
    an objective lens unit having a positive refractive power;
    a relay lens unit for relaying and re-forming an image formed by said objective lens unit, said relay lens unit consisting of a positive lens having a positive refractive power and a negative lens having a negative refractive power; and
    an eyepiece lens unit for observing an image formed by said relay lens unit,
    wherein the following condition is satisfied:

$$0.3 < |f_P/f_N| < 0.7$$

where $f_P$ and $f_N$ are respectively focal lengths of said positive lens and said negative lens.

* * * * *

UNITED STATES PATENT AND TRADEMARK OFFICE
CERTIFICATE OF CORRECTION

PATENT NO. : 4,964,686

DATED : October 23, 1990

INVENTOR(S) : Masatake Kato

It is certified that error appears in the above-identified patent and that said Letters Patent is hereby corrected as shown below:

TITLE PAGE:

AT [57] IN THE ABSTRACT

Line 1, "opitcal" should read --optical--.
Line 24, "surfaces" should read --surface--.

COLUMN 10

Line 14, "unit said" should read --unit, said--.

Signed and Sealed this

Thirtieth Day of July, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,964,686
DATED : October 23, 1990
INVENTOR(S) : MASATAKE KATO It is certified that error appears in the above-identified patent and that said Letters Patent is hereby corrected as shown below:

On the title page, item [73]:

"Canon Kabushiki Kaishi" should read --Canon Kabushiki Kaisha--.

Signed and Sealed this

Seventeenth Day of March, 1992

Attest:

HARRY F. MANBECK, JR.

*Attesting Officer*   Commissioner of Patents and Trademarks